United States Patent [19]
Raidel

[11] 4,331,348
[45] May 25, 1982

[54] VEHICLE SUSPENSION
[76] Inventor: John E. Raidel, Rte. 9, Box 400-M, Springfield, Mo. 65804
[21] Appl. No.: 110,778
[22] Filed: Jan. 9, 1980
[51] Int. Cl.³ .............................................. B60G 5/00
[52] U.S. Cl. ................................. 280/686; 267/19 R
[58] Field of Search ............. 280/104, 677, 718, 679, 280/680, 684, 700, 686; 267/21;19 R;19 A/

[56] References Cited
U.S. PATENT DOCUMENTS

| | | | |
|---|---|---|---|
| 2,284,665 | 6/1942 | Larison | 280/686 |
| 2,520,777 | 8/1950 | Page | 280/680 |
| 2,613,954 | 10/1952 | Arila | 280/679 |
| 2,698,186 | 12/1954 | Pehl | 280/686 X |
| 2,704,674 | 3/1955 | Gray, Jr. | 280/686 |
| 2,951,709 | 9/1960 | Ward | 280/680 |
| 3,083,980 | 4/1963 | Page | 280/680 |
| 3,099,459 | 7/1963 | Zalar et al. | 280/680 |
| 3,367,677 | 2/1968 | Preddy, Jr. | 280/680 |
| 3,471,165 | 10/1969 | Raidel | 280/104 |
| 3,632,128 | 1/1972 | Raidel | 267/21 X |
| 3,751,063 | 8/1973 | Raidel | 280/104 |
| 3,912,294 | 10/1975 | Raidel | 280/679 |
| 4,089,544 | 5/1978 | Raidel | 280/709 |

Primary Examiner—David M. Mitchell
Attorney, Agent, or Firm—Rogers, Eilers & Howell

[57] ABSTRACT

A vehicle suspension assembly having a spring means resiliently supporting axle loading, and including an axle seat to which a vehicle axle is secured. The axle seat is pivotally mounted to apply a moment to the axle seat upon axle loading, said moment applying a force to the spring proportional and in opposition to the loading force. The suspension further includes a mounting assembly for mounting an oscillating member such as a compensator to a fixed member such as a pedestal. The mounting assembly comprises a bushing assembly having a center shaft, the oscillating member oscillating about the axis of said shaft. A sleeve surrounds the shaft, and one of said oscillating or fixed members is secured to the sleeve. The other of said members has an open slot therein which is sized to allow insertion of the bushing shaft therein by passing the shaft through the open end of the slot. Clamping means secure the shaft to the slotted member.

20 Claims, 8 Drawing Figures

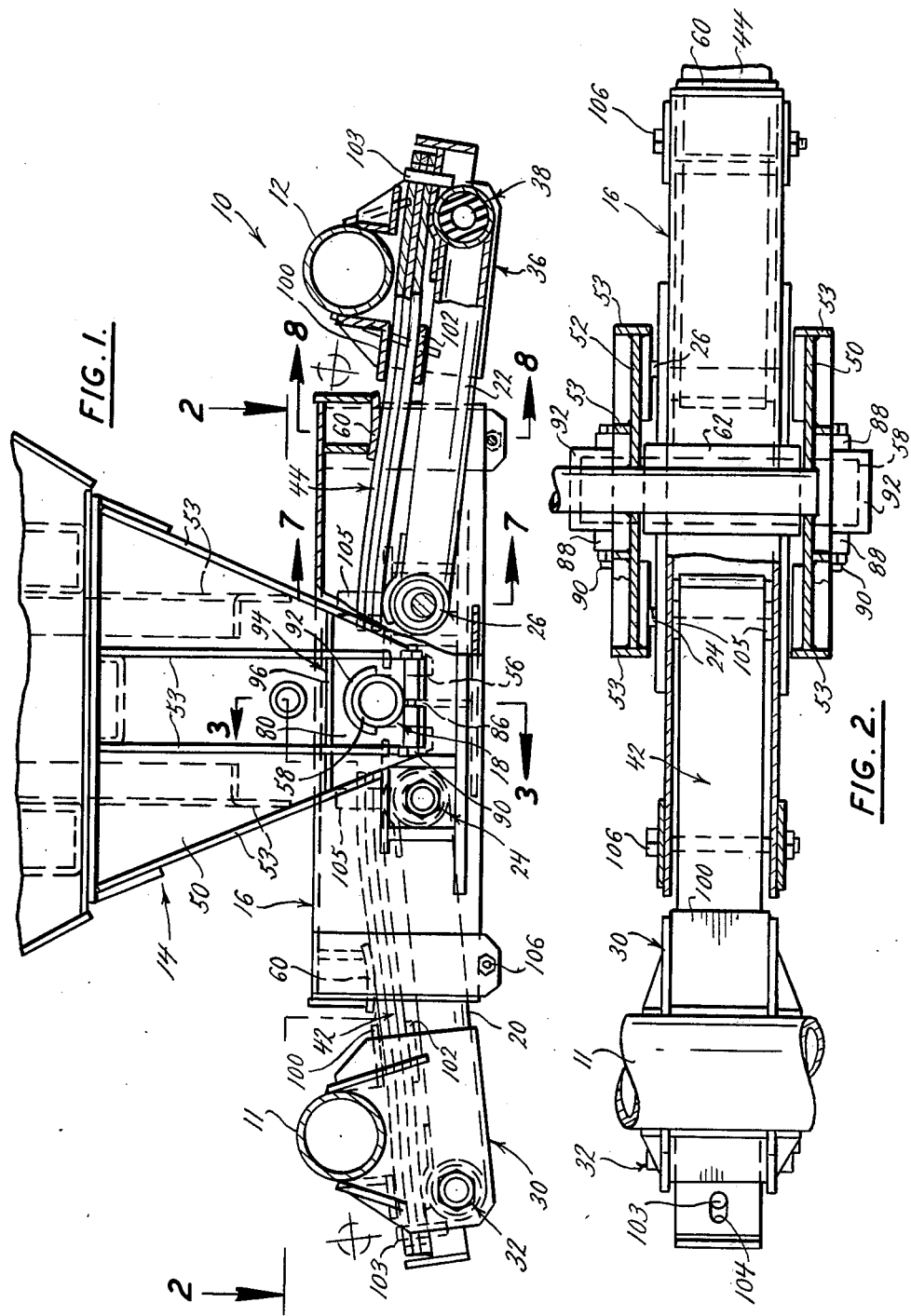

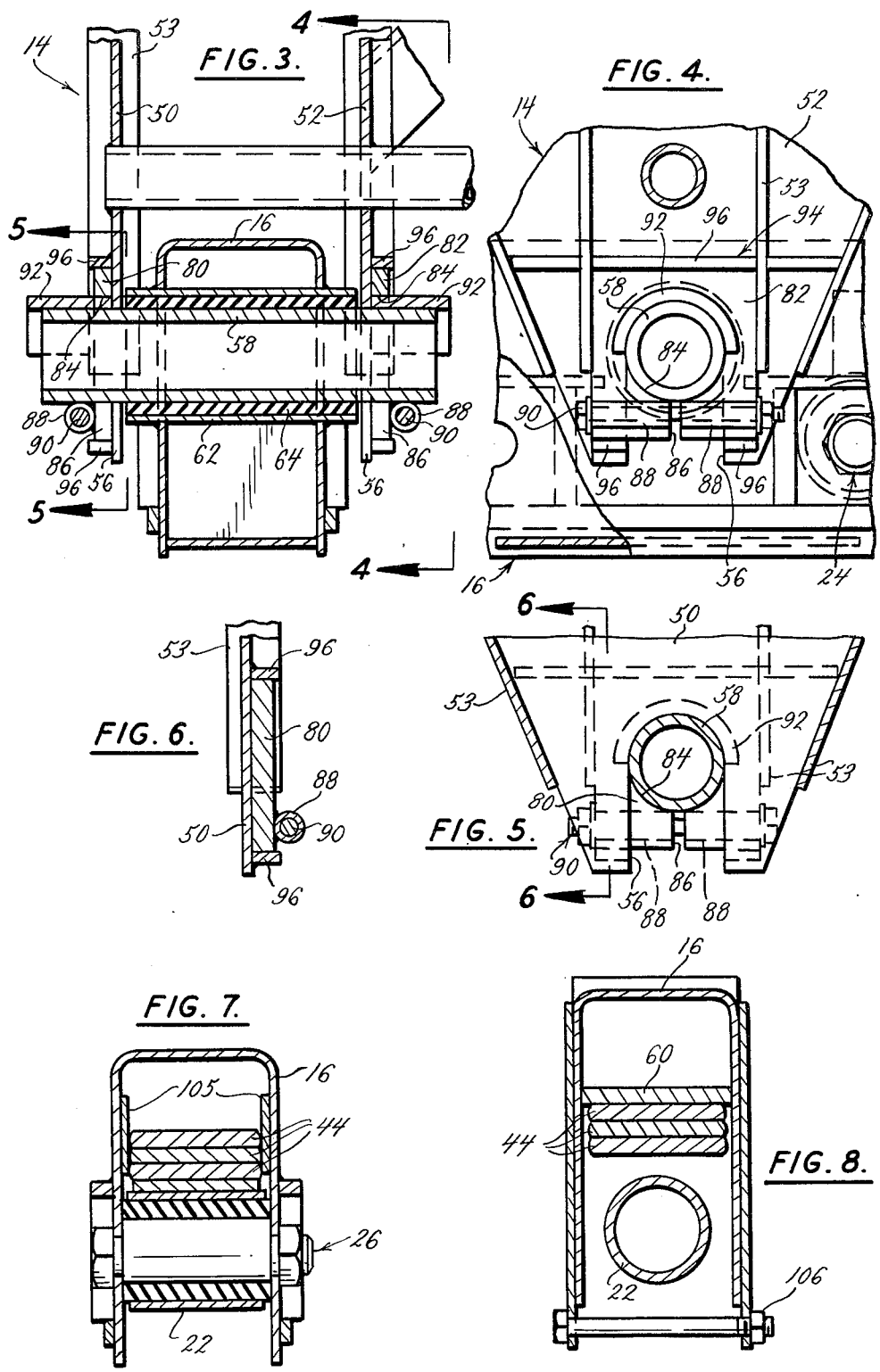

VEHICLE SUSPENSION

BACKGROUND AND SUMMARY OF THE INVENTION

This invention generally relates to a vehicle suspension. More specifically, in one aspect of the invention an opposing force is created to act proportionally against the loading force on the spring member so that a lighter spring member may be used than normally required for greater loads.

For example, with a leaf spring suspension the opposing force acts against the deflection of the spring with the opposing force increasing in magnitude as the loading force increases. Without the opposing force, the spring deflection for a given load would be greater, thus requiring a heavier and more expensive spring.

The opposing force is created by a moment produced through operation of the axle seat. As the load increases, the magnitude of the moment, and thus the opposing force, also increases. To use the leaf spring suspension as an example, the spring, extending generally fore and aft, has one end pivotally mounted from the vehicle chassis, such as by a hanger, for generally up and down movement. The axle seat to which a vehicle axle is mounted is pivotally secured at the other end of the spring at a location beyond the axis of the axle creating a moment to the axle seat upon loading the axle. A force is created in response to the moment, such as through coaction between the axle seat and leaf spring, which acts in opposition to the loading force and thus resists deflection of the leaf spring, with the opposing force being proportional to the loading force. Therefore, as the loading force increases, the opposing force also increases to further resist spring deflection and help support the spring.

In another aspect of the invention, an improved mounting assembly mounts an oscillating member to a fixed member. Where the suspension assembly is the compensator type, the oscillating member may be a compensator and the fixed member a pedestal.

The mounting assembly of the present invention allows the use of a relatively inexpensive yet structurally strong straddle mounting arrangement which is also exceptionally easy to assemble and disassemble. Thus, in a compensator type suspension, the mounting assembly includes a bushing assembly having a center shaft about which the compensator oscillates. The compensator is secured to a sleeve which surrounds the shaft, and is mounted at the lower end of a pedestal which depends from the vehicle chassis. The lower end of the pedestal has a slot which is open at its lower end and sized to allow insertion of the bushing shaft therein by passing the shaft through the lower open end and upwardly along the slot to a selected position. A clamping means, such as a split plate having an opening therein to closely receive the end of the shaft, is held against rotation relative the pedestal and includes means for adjustably tightening the plate on the shaft.

With this improved mounting assembly, the compensator can be installed on the pedestal by simply lowering the pedestal onto the shaft of the bushing assembly to which the compensator is mounted with the slot at the lower end of the pedestal passing over the shaft. The split plate is then placed over the shaft and secured thereto. Most of the assembly work required can be done without reaching under the vehicle. No expensive castings are required in the assembly, it being possible and even preferable to fabricate the pedestal and compensator from standard steel plating and tubing.

These and other advantages will be apparent from the drawing and from the detailed description to follow.

DESCRIPTION OF THE DRAWING

FIG. 1 is a side elevation view of a dual axle suspension assembly of the compensator type incorporating the present invention, with portions broken away;

FIG. 2 is an enlarged view in section taken generally along the line 2—2 of FIG. 1;

FIG. 3 is an enlarged view in section taken generally along the line of 3—3 of FIG. 1;

FIG. 4 is a view in section taken generally along the line 4—4 of FIG. 3;

FIG. 5 is a view in section taken generally along the line 5—5 of FIG. 3;

FIG. 6 is a view in section taken generally along the line 6—6 of FIG. 5;

FIG. 7 is an enlarged view in section taken generally along the line 7—7 of FIG. 1; and FIG. 8 is an enlarged view in section taken generally along the line 8—8 of FIG. 1.

DETAILED DESCRIPTION OF A PREFERRED EMBODIMENT

With reference to the drawing, there is shown a dual axle suspension assembly 10 of the compensator type incorporating the present invention with front and rear axles 11 and 12. It is to be understood that the suspension assembly shown is duplicated on the other side of the vehicle. Generally, the assembly includes a pedestal 14 depending from the chassis of the vehicle, a compensator 16 pivotally supported at the lower end of the pedestal by a bushing assembly 18, and front and rear torque arms 20 and 22. The torque arms extend generally in the fore and aft direction with the rearward end of the torque arm 20 pivotally mounted to the compensator 16 by a bushing assembly 24, and the forward end of the torque arm 22 pivotally mounted to the compensator by a bushing assembly 26.

The front axle 11 is secured to a front axle seat 30 which in turn is pivotally connected at the forward end of the torque arm 20 by a bushing assembly 32, the axis of which is located forwardly of the axis of the axle 11, for reasons to be described. The rear axle 12 is secured to a rear axle seat 36 which in turn is pivotally mounted at the rearward end of the torque arm 22 by a bushing assembly 38, the axis of which is located rearwardly of the axis of the axle 12, for reasons to be described.

The suspension assembly also includes front and rear leaf springs 42 and 44 which extend generally in the fore and aft direction and each of which are located between its respective torque arm and axle. Thus, the front leaf spring 42 extends generally along the top of, and in spaced relation to, the torque arm 20 and beneath the front axle 11. The rear end of the front leaf spring is secured to the compensator 16 at a location generally above the bushing assembly 24, and its front end is secured to the axle seat 30 near the front end thereof so as to rest on top of the bushing assembly 32. Likewise, the rear spring 44 extends along the top of, and in spaced relation to, the torque arm 22, and beneath the rear axle 12. The forward end of the leaf spring 44 is secured to the compensator at a location generally above the bushing assembly 26, and is secured to the axle seat 36 at the rear end thereof so as to rest on top of the bushing assembly 38.

With this general description, the assembly will now be described in more detail.

The pedestal 14 includes spaced parallel plates 50 and 52 with suitable gusset and reinforcing members 53 as are well known in the art. At the lower end of each parallel plate 50 and 52 is a U-shaped slot 56 sized to closely receive the shaft 58 of the bushing assembly 18. The slot 56 is open at the bottom so as to allow the shaft to enter the slot through the open end as will be more fully explained.

The compensator 16 is a generally U-shaped channel member in cross section (FIG. 3) and is generally the same as that disclosed in U.S. Pat. No. 3,751,063 incorporated herein by reference. At the fore and aft end of the compensator are bearing members 60 which bear downwardly on the leaf springs 42 and 44 to cause deflection of the leaf springs upon axle loading.

As shown in FIG. 3, the bushing assembly 18 extends through a suitable opening in the compensator 16 with the outer metal sleeve 62 of the bushing assembly being secured, such as by welding, to the walls of the compensator. The central shaft 58 of the bushing assembly extends within the sleeve 62 with an elastomeric material 64 therebetween. The shaft 58 extends beyond both ends of the sleeve 62 and elastomeric material 64 and into the slots 56 at the lower end of the pedestal. Thus, it can be seen that with the bushing assembly 18 mounted to the compensator, the compensator can be mounted at the lower end of the pedestal by lowering the pedestal onto the shaft 58, the spaced parallel plate members 50 and 52 of the pedestal straddling the compensator with the bushing shaft seated within the U-shaped slots.

Split plates 80 and 82 secure the bushing shaft 58 against rotation relative the pedestal. The split plates 80 and 82 are identical with the plate 80 positioned around the shaft 58 at the outer end of the shaft, and the plate 82 positioned over the inner end of the shaft. Each of the split plates has an opening 84 (FIGS. 3, 4 and 5) which closely receives the end of the shaft. The plates are split at 86 and have sleeves 88 secured to the plate, such as by welding on either side of the split. Nut and bolt assemblies 90 extend through the sleeves 88 for adjustably tightening the split plates onto the bushing shaft. The split plates have hoods 92 to position the plates on the bushing shaft.

Each split plate seats snuggly within a frame 94 comprised of frame members 96 secured to the outer surfaces of the parallel plates 50 and 52 of the pedestal. The frames 94 prevent the split plates, and thus the bushing shaft, from rotating relative the pedestal.

The bushing assemblies 24, 26, 32, and 38 may be of types well known in the art such as for example those shown and described in U.S. Pat. No. 4,089,544 incorporated herein by reference. Moreover, the axle seats 30 and 36 may be of generally the same construction as that shown in U.S. Pat. No. 4,089,544 except for the manner in which the axle seats cooperate with the leaf springs.

Thus, with the present invention, the axle seats 30 and 36 have bearing members 100 positioned above the leaf springs, and bearing members 102 positioned beneath the leaf springs in the space between the torque arm and the spring. In the case of the front axle seat 30, the bearing members 100 and 102 are located just forwardly of the bearing member 60 of the compensator, and in the case of the rear axle seat 36 the bearing members 100 and 102 are located just rearwardly of the bearing member 60.

Each of the leaf springs 42 and 44 extends through its respective axle seat between the bearing members 100 and 102, beneath the bearing member 60, and with one end thereof resting on top of its respective bushing assembly 24 or 26. The outer ends of the leaf springs are secured to the axle seats by pins 103 extending through slots 104 in the springs and into the axle seats. The inner ends of the leaf springs rest on top of the bushing assemblies 24 and 26 and are positioned laterally by spacers 105.

Bolts 106 at the forward and rearward lower ends of the compensator provide stops for the torque arms.

OPERATION

To assemble the compensator to the pedestal, the compensator together with the bushing assembly 18 is positioned beneath the pedestal, and the pedestal is then lowered onto the shaft 58 of the bushing assembly with the shaft sliding through the open U-shaped slots 56. The split plates 80 and 82 are then placed over the ends of the shaft and pushed against the plates 50 and 52 within the frames 94. The bolt assemblies 90 are then tightened to close the split plates on the shaft to keep it from rotating relative the pedestal.

The straddle mount pedestal is a very strong construction and can be fabricated from plate thus eliminating the need for castings. Assembly of the compensator to the pedestal is made exceptionally easy with most of the required work performed from the outer side of the assembly, for both convenience and safety.

In operation of the assembly, as load is applied to the axles, the bearing members 60 bear downwardly on the leaf springs which resiliently support the load. As load is applied, a moment is created in each of the axle seats which produces a force through interaction of the bearing members 102 against the lower sides of the leaf springs, which force acts in opposition to the load. Thus, as load is applied, the front axle seat tends to pivot counterclockwise, and the rear axle seat clockwise, about the bushing assemblies 32 and 38, respectively, as viewed in FIG. 1.

By way of further explanation, these moments are created because of the forward spacing of the axis of the bushing assembly 32 relative the axis of the front axle, and the rearward spacing of the axis of the bushing assembly 38 relative the axis of the rear axle. As load is applied, the chassis, pedestal, compensator, leaf springs, and torque arms move downwardly while the axles remain vertically stationary, as the wheels of the vehicle are on the ground. This creates moments in the axle seats causing the axle seats to pivot as previously described. This pivotal movement in turn causes the bearing members 102 to bear upwardly on the leaf springs in opposition to the load force applied downwardly on the leaf springs through the bearing members 60. While the opposing force acting on the springs is less than the load, it is proportional to the load. The greater the load, the greater the opposing force.

Thus, the opposing force tends to reduce spring deflection and support the leaf springs, with the support increasing with increased load. This allows the use of lighter leaf springs than might otherwise be required and helps to reduce spring failure due to excessive loads.

The compensator oscillates about the shaft of the bushing assembly 18 to distribute the load between the axles.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In a vehicle suspension assembly for mounting a vehicle chassis to a vehicle axle and having a spring means resiliently supporting axle loading such that the loading of said axle applies a loading force to said spring means: a torque arm extending generally fore and aft and mounted for generally up and down pivotal movement, an axle seat to which said axle is mounted, said axle seat being pivotally mounted at the end of said torque arm beyond the axis of said axle, and means applying force to said spring means in opposition to the loading force, said opposing force being proportional to said loading force and being responsive to the tendency of said axle seat to pivot upon axle loading.

2. In the vehicle suspension of claim 1 wherein said spring means is a leaf spring extending generally fore and aft in position between said torque arm and axle.

3. In a vehicle suspension assembly for mounting a vehicle chassis to a vehicle axle and having a leaf spring resiliently supporting axle loading such that the loading of said axle applies a loading force to said leaf spring: a torque arm extending generally fore and aft and mounted for generally up and down pivotal movement, an axle seat to which said axle is mounted, said axle seat being pivotally mounted at the end of said torque arm beyond the axis of said axle, means operatively mounting said leaf spring for deflecting said leaf spring in response to said loading force, and means applying force to said leaf spring in opposition to the loading force to resist said spring deflection upon axle loading, said opposing force being proportional to said loading force and being responsive to the tendency of said axle seat to pivot upon axle loading.

4. In the suspension assembly of claim 3 wherein one end of said leaf spring is secured to said axle seat at a location outwardly of the axis of said axle.

5. In a dual axle vehicle suspension assembly of a compensator type for mounting a vehicle chassis to front and rear vehicle axles and having leaf springs resiliently supporting axle loading such that the loading of said axles applies loading forces to said leaf springs: a pedestal depending from said vehicle chassis and forming a part thereof, a compensator pivotally mounted to the pedestal for rocking movement about a transverse axis parallel to said axles, a front leaf spring supported at one end to the compensator, a front axle seat to which the front axle is mounted, said front axle seat being mounted at the forward end of said leaf spring at a location forwardly of the axis of said front axle for pivotal movement relative to said front leaf spring, a rear leaf spring supported at one end to said compensator, a rear axle seat to which the rear axle is mounted, said rear axle seat being mounted at a location rearwardly of the axis of said rear axle for pivotal movement relative said rear leaf spring, said compensator coacting with the leaf springs to apply loading forces thereto upon the loading of said axles, said axle seats applying forces to said leaf springs in opposition to said loading forces with the opposing forces being proportional to the loading forces and being responsive to the tendency of said axle seats to pivot upon axle loading.

6. In the suspension assembly of claim 5 wherein said compensator bears downwardly on, and said axle seats bear upwardly on, said leaf springs upon loading.

7. In the suspension assembly of claim 5 further comprising front and rear torque arms, one end of said front torque arm being pivotally connected to said compensator and its other end pivotally connected to said front axle seat at a location forward of the axis of said front axle, one end of said rear torque arm being pivotally connected to said compensator and its other end pivotally connected to said rear axle seat at a location rearwardly of the axis of said rear axle.

8. In a vehicle suspension for mounting a vehicle chassis to a vehicle axle, a mounting assembly for mounting an oscillating member to a fixed member comprising: a bushing assembly including a shaft about which said oscillating member oscillates, a sleeve surrounding said shaft, one of said members being secured to said sleeve, the other of said members having an open slot therein sized to allow insertion of the bushing shaft therein by passing the shaft through the open end of the slot, and clamping means securing said shaft against rotation relative said slotted member.

9. In the suspension assembly of claim 8, wherein said clamping means is a split plate having an opening therein to closely receive the end of said shaft, and means for adjustably tightening said split plate on said shaft.

10. In the suspension assembly of claim 9, said mounting assembly further comprising frame members secured to said slotted member and engaging said split plate to prevent rotation of said plate, and thus said shaft, relative said slotted member upon oscillation of said oscillating member.

11. In the suspension assembly of claim 8, wherein said slotted member straddles said member to which the sleeve is mounted.

12. In the suspension assembly of claim 11, wherein a clamping means is secured to said shaft at each side of said slotted member.

13. In the suspension assembly of claim 8, wherein the member to which said sleeve is mounted is the oscillating member, and the slotted member is the fixed member.

14. In a vehicle suspension assembly for mounting a vehicle chassis to a vehicle axle including a pedestal depending from the chassis and a compensator pivotally mounted to the pedestal for oscillating movement about a transverse axis, said pedestal mounting for said compensator comprising: a bushing assembly including a shaft about which said compensator oscillates, a sleeve surrounding said shaft, said compensator being secured to said sleeve, a slot in the lower end of said pedestal, said slot being open at its lower end and sized to allow insertion of the bushing shaft therein by passing the shaft through the open lower end of the slot, and clamping means securing said shaft against rotation relative said pedestal.

15. In the suspension assembly of claim 14, wherein said clamping means is a split plate having an opening therein to closely receive the end of said shaft, and means for adjustably tightening said split plate on said shaft.

16. In the suspension assembly of claim 15, said mounting assembly further comprising frame members secured to said pedestal and engaging said split plate to prevent rotation of said plate and thus said shaft upon oscillation of said compensator.

17. In the suspension assembly of claim 16, wherein said pedestal at its lower end straddles said compensator.

18. In the suspension assembly of claim 17, wherein a split plate is secured to said shaft at each side of said pedestal.

19. In a vehicle suspension assembly for mounting a vehicle chassis to a vehicle axle: a wheel axle seat and a vehicle chassis load support; a torque arm pivotally attached to the axle seat and to the load support; and elongate spring means extending between the load support and the wheel axle seat, means on the load support and the axle seat to support the spring means; means to apply the load from the load support at a predetermined point on the spring means between the supports therefor on the load support and the axle seat and hence to apply load to the axle seat; and means located between the load applying means and the spring means support on the axle seat to engage the spring means and to apply a predetermined portion of the load of the load support to the spring means in opposition to the load of the load support, at a point on the spring means spaced from the said predetermined point.

20. The assembly of claim 19, wherein the spring means is a leaf spring supported at spaced points on its length on the load support and the axle bracket.

* * * * *